Figure 3:
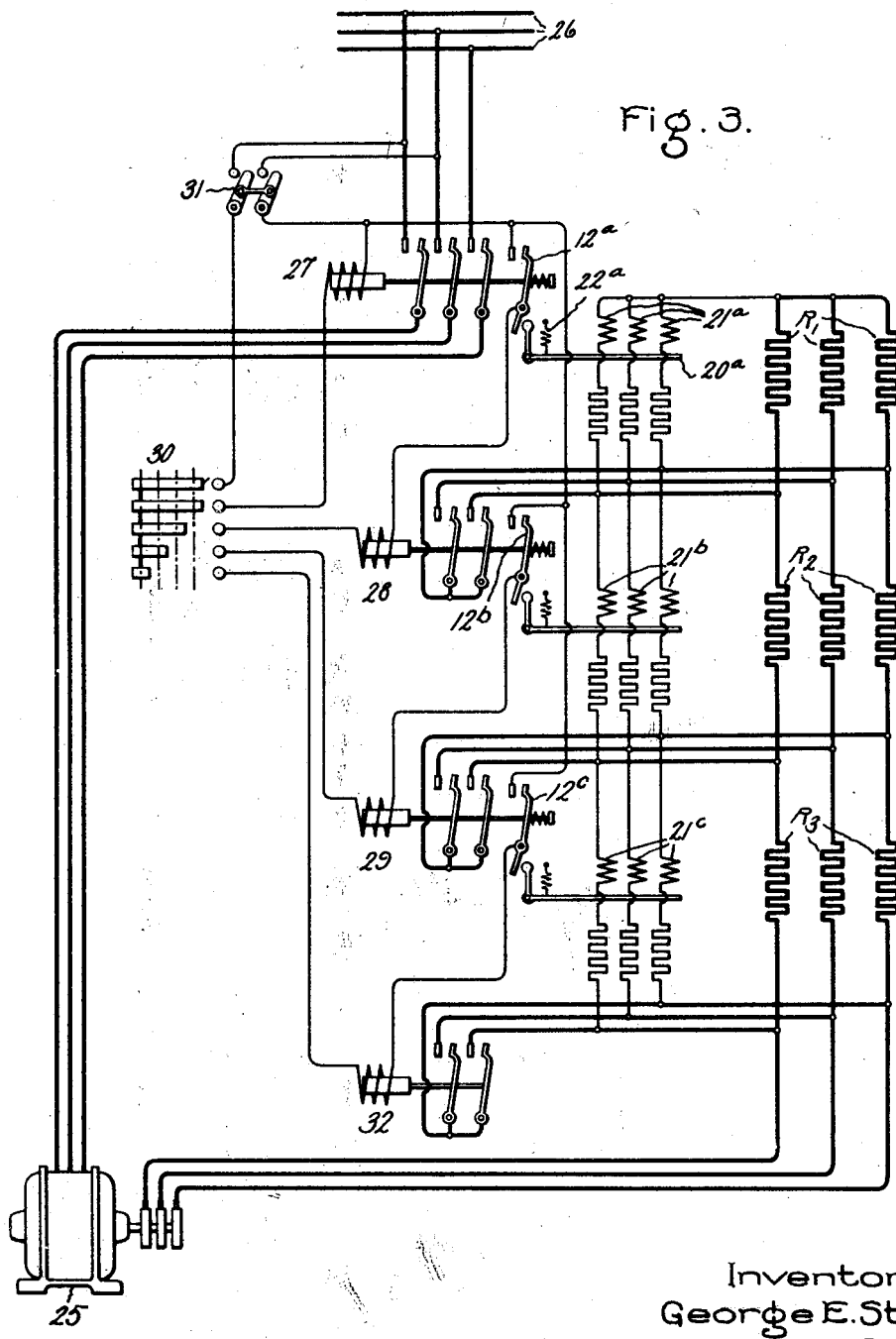

Sept. 16, 1930.  G. E. STACK  1,776,136
ELECTRIC SWITCH AND SYSTEM OF MOTOR CONTROL EMPLOYING THE SAME
Filed June 1, 1925   2 Sheets-Sheet 1
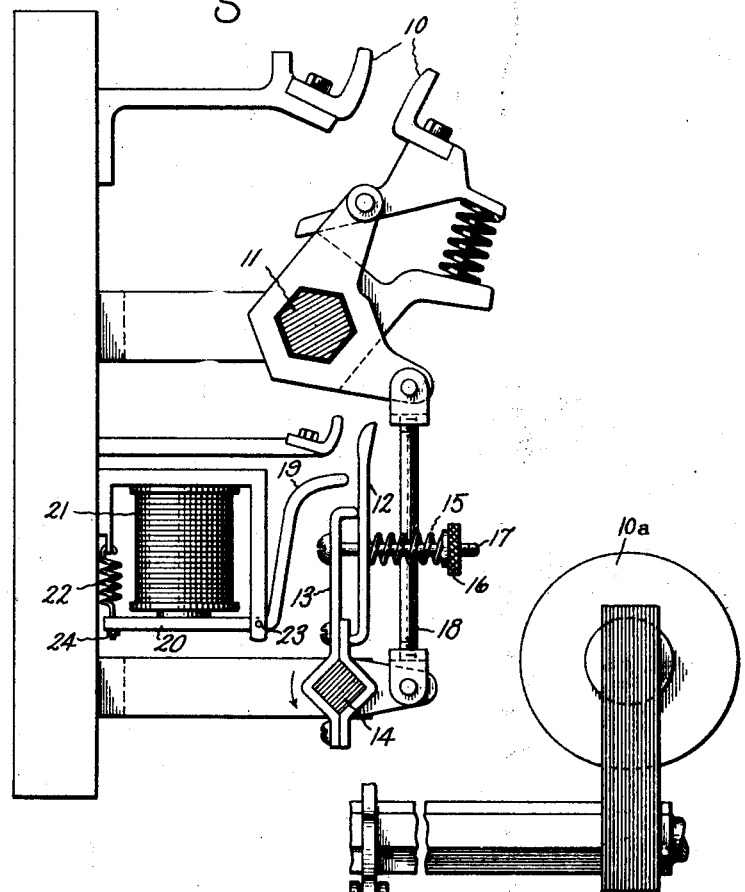
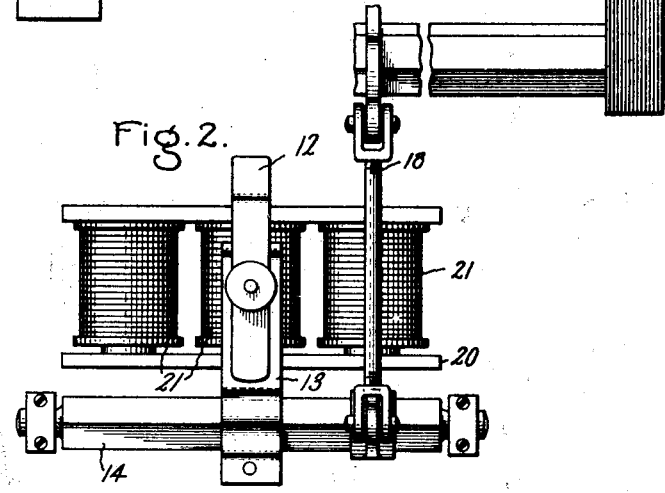
Inventor:
George E. Stack,
by
His Attorney.

Patented Sept. 16, 1930

1,776,136

UNITED STATES PATENT OFFICE

GEORGE E. STACK, OF BALLSTON SPA, NEW YORK, ASSIGNOR TO GENERAL ELECTRIC COMPANY, A CORPORATION OF NEW YORK

ELECTRIC SWITCH AND SYSTEM OF MOTOR CONTROL EMPLOYING THE SAME

Application filed June 1, 1925. Serial No. 33,917.

My invention relates to improvements in electric switches and in particular to electric switches and systems for controlling electric motors.

A common arrangement heretofore used for the control of electric motors has involved the use of disc type interlocks or auxiliary switches which operate by the force of gravity to introduce the desired interval between the closing of successively operated motor controlling switches. The auxiliary switches are under the control of electromagnetic means energized in accordance with a changing motor condition, such as the motor current, the speed, the voltage of the secondary of an alternating current motor, or in accordance with other conditions. One of the practical objections to such auxiliary switches is that since they depend for operation on the force of gravity, they are subject to vibration which causes arcing at the contacts and uncertainty of operation. Another practical objection is that the contact surfaces of such auxiliary switches have been horizontal due to the impracticability of placing such surfaces otherwise, and hence the surfaces are quite apt to collect dust and dirt which introduce another uncertainty of operation in establishing the desired electrical circuit. These conditions have been particularly troublesome because of the fact that the auxiliary switches ordinarily control coil circuits which are highly inductive.

In accordance with my invention, the objections heretofore referred to and others which will be well understood by those skilled in the art, are overcome by causing the contact pressure of the auxiliary switch to be derived from the contactor with which the auxiliary switch is associated, thus insuring that the contact pressure will be more than sufficient to prevent vibration, and also insuring that the contacts will clean themselves during the closing movement. Rugged vertical contacts may thus be used and considerable values of current may be effectively controlled. The closing of the auxiliary switch associated with a contactor may be made in accordance with any desired condition for the acceleration or general control of the motor, by the provision of an electromagnetic stop which arrests the closing movement of the auxiliary switch against the strain set up by the contactor to close the auxiliary switch when the contactor closes. This electromagnetic stop is moved out of the arresting position thereof when the closing strain on the auxiliary switch overcomes the holding effect on the stop. The closing of the auxiliary switch may be adjusted by varying the energization of the electromagnet or electromagnets controlling the stop or by varying the closing strain set up by the contactor on the auxiliary switch, or by varying both of these.

For a better understanding of the invention, reference is had to the accompanying drawings, in which Fig. 1 is a side view of a contactor with a controlling relay in accordance with the invention, the operating electromagnet being omitted from this figure in order to show the other parts more clearly, Fig. 2 is a detail of the arrangement of Fig. 1, showing a front view of the relay with the auxiliary switch and the operating electromagnet for the main switch contacts, and Fig. 3 is a very simplified diagram of a motor control system in accordance with the invention.

Referring to the drawings, the contactor having main contacts 10 mounted on a shaft of insulating material 11 is intended to be operated in any suitable manner, as by means of an electromagnet which controls the contacts 10 as well as other contacts, as will be described in connection with Fig. 3. Contactors of this sort are old and are well understood by those skilled in the art. One of the features of the present invention is the arrangement whereby the contactor in closing applies a closing strain to an auxiliary switch, in the present case to the switch member 12 of the relay associated with this contactor. To this end, the switch member 12 of the relay is supported on the arm 13 secured to the shaft 14, the contact member 12 being resiliently held in engagement with the support 13 by means of the spring 15 which is interposed between the contact finger 12 and the adjusting nut 16 mounted on the post 17.

The spring 15 thus serves as a resilient connection between the main contacts 10 and the auxiliary switch member 12. The shaft 14 on which the relay contact finger is mounted is operated by means of the insulating connecting rod 18 which connects the contactor with its associated relay so that when the contactor closes its main contacts, it moves the relay switch member and puts the same under a strain to the closed position. The closing movement of the relay switch member 12 is arrested by means of the stop 19 which is under the control of the armature 20, which in turn is under the magnetic influence of the electromagnets 21. The armature 20 is biased to the attracted position by means of the spring 22, and this spring also biases the stop 19 into the arresting position with reference to the relay switch member 12.

Assume that the winding of the operating electromagnet $10^a$ of the contactor is energized to close the main contacts 10 of the contactor and that the winding of the relay are energized electromagnets 21 of the relay are energized in accordance with any suitable function for the proper control of the motor or other device. The movable contact of the main contacts 10 will move into engagement with the stationary contact, and the connecting rod 18 will move upwardly, thereby rotating the shaft 14 of the relay in the counter-clockwise direction. The relay switch member or contact finger 12 will be correspondingly moved until this contact finger comes into engagement with the end of the stop 19. Further rotation of the shaft 14 will cause the spring 15 to be compressed, thereby setting up a closing strain for the relay contact finger.

It will be assumed that the electromagnets 21 are energized at this time in excess of the value at which it is intended that the relay contacts shall close. The stop 19 will be effective to hold the contact finger 12 in the open position against the closing strain of the spring 15. However, when the energization of the electromagnets 21 has decreased to the predetermined value, the magnetic holding effect of these electromagnets on the armature 20 is decreased to such a value that the closing strain of the spring 15 will overcome the holding open effect of the electromagnets so that the stop 19 will be moved counter-clockwise about its pivotal support 23, and the armature 20 will be moved out of the attracted relation with respect to the electromagnets 21. This will be against the action of the spring 22 which biases the armature 20 into the attracted position. When the contact finger 12 closes, the attraction of the electromagnets on the armature 20 will be a small value since an appreciable air gap has been introduced between the armature and the cores of the electromagnets.

While it will be observed from Fig. 2 that three electromagnets 21 have been provided for controlling the armature 20, it will be understood that the invention is not necessarily limited to any particular number of electromagnets for controlling this armature. I have shown three electromagnets because of the fact that in Fig. 3 I have shown the contactors and relays of Figs. 1 and 2 employed in the control of a three phase alternating current motor by accelerating contactors which short-circuit the resistance in the rotor circuit of the motor, the contactors being under the control of relays which are energized in accordance with the secondary voltage of the motor.

It will be observed from the previously described arrangement of Figs. 1 and 2, that the closing force applied to the relay switch contact member is an appreciable value, since this closing force is supplied by the same means which closes the main contacts of the contactor. Substantial contact pressures may thereby be obtained for the relay contacts so that difficulties due to the uncertainty of establishing proper electrical contact are obviated. It will also be observed that the relay contacts may be in the vertical plane and that the contact finger 12 and the support therefor are so designed that the contact finger makes a sliding or wiping engagement with respect to the cooperating stationary contact. It will be well understood by those skilled in the art that this is desirable, since the contacts are thus kept clean so as to establish a good electrical contact.

It will be further observed that the operation of the relay may be adjusted to a great nicety. A plurality of adjusting devices is provided for this purpose, any one of which may be employed to effect a certain measure of adjustment and all three of which may be employed, if desired, to effect the maximum of adjustment. Thus, the closing strain on the relay contact finger 12 may be adjusted within rather large limits by adjusting the position of the adjusting nut 16 on the post 17. A rather fine degree of adjustment may be had by adjusting the holding effect on the armature 20 of the spring 22, by adjusting the position of the nut 24 on the end of the spring 22. The operation of the relay is further adjusted by regulating the energization of the electromagnets 21. This may be done in any suitable manner, as for instance by shunting the windings of the electromagnets, or by placing resistors in series with these windings, as is indicated in Fig. 3.

In Fig. 3 I have shown in very simple diagram a system of motor control for a three phase alternating current motor of the wound rotor type, in which the acceleration of the motor is controlled by regulating resistors in the motor secondary circuit. The primary of the three phase electric motor 25 is connected to the source of supply 26 by means of the line contactor 27. This contactor 27 has a relay associated therewith, as described in connection with Figs. 1 and 2. The relay has a contact finger 12$^a$ and controlling electromagnets 21$^a$. The relay associated with the line contactor 27 is arranged to control the accelerating contactor 28 so as to thereby short-circuit the sections R$^1$ of the accelerating resistance in the rotor circuit of the motor. The contactor 28 is also provided with a similar relay contact member 12$^b$ and electromagnets 21$^b$. The electromagnets 21$^b$ are connected across the resistors R$^2$ which are short-circuited under the control of the contactor 29 which is governed by the contactor finger 12$^b$ associated with the contactor 28. The contactor 29 is likewise provided with a similar relay having a contact finger 12$^c$ which is under the control of the electromagnets 21$^c$. The electromagnets 21$^c$ are connected across the resistors R$^3$. The operation of the motor is governed by the operator under the control of the master switch 30.

As thus constructed and arranged, and with the parts in their respective positions indicated in Fig. 3, the operation of the system is as follows: Assume that the control circuit disconnecting switch 31 is closed. When the master controller 30 is moved into first operative position, the line contactor 27 is thereupon energized to close. This connects the motor to the source of supply 26 and energizes the electromagnets 21$^a$, 21$^b$ and 21$^c$ of the controlling relays, these electromagnets being energized in accordance with the voltage of the motor secondary. When the line contactor 27 closes, the relay contact finger 12$^a$ is put under a closing strain, but the movement of the contact finger to the closed position is arrested under the control of the armature 20$^a$ associated with the electro-magnets 21$^a$. The arrangement is such that the main contacts of the contactor will close before the auxiliary switch member is brought into engagement with its electromagnetic stop. When the motor accelerates and the voltage induced in the secondary of the motor has gradually reduced to the predetermined value, the electromagnets 21$^a$ will be unable to set up a holding force on the armature 20$^a$ sufficient to overcome the closing strain on the relay contact finger 12$^a$, so that the relay will close its contacts and partially complete a circuit for the accelerating contactor 28. The motor may be accelerated step by step at the will of the operator. But for brevity it will now be assumed that the master controller 30 is moved to its full operative or final position. In such a case, the contactor 28 is immediately energized to close upon the closing of the relay associated with the line contactor 27. The closing of the accelerating contactor 28 short-circuits the resistance R$^1$ in the motor secondary circuit as well as the relay coils 21$^a$ so that there will be no tendency of the relay electromagnets to open the relay contact finger. The relay associated with the accelerating contactor 28 similarly controls the contactor 29, and the relay associated with the contactor 29 similarly controls the contactor 32 which completely short-circuits the resistance in the rotor secondary circuit and establishes the full speed operating condition for the motor. When the motor controlling contactors open, they also forcibly open their associated relay contacts.

It will be observed that although I have disclosed a system in which the acceleration of the motor is in accordance with the current induced in the secondary of the motor, the invention is not necessarily limited to such a system, since it is likewise applicable to the control of the motor in accordance with the current taken by the motor from the source of supply, or in accordance with a time function or in accordance with any suitable controlling condition. In case the control of the motor is in accordance with the current taken by the motor from the source of supply, a single electromagnet in the motor primary circuit for each of the relays will provide the desired control. When the control is in accordance with the rotor voltage, it is desirable to provide three electromagnets for controlling the relay, in the manner as indicated, since by reason of the variation of the frequency of the current in the motor secondary, a single electromagnet may not operate reliably. Thus, when the motor speed approaches the full speed condition, the frequency of the current in the secondary becomes quite low and thus has a tendency to make the operation uncertain in case a single electromagnet is provided. However, by the provision of an electromagnet in each of the phases of the rotor secondary, a balancing effect is obtained which overcomes the conditions caused by the decreasing frequency of the current in the motor secondary.

What I claim as new and desire to secure by Letters Patent of the United States is:

In combination, an electric switch, an auxiliary switch member controlled thereby, a spring interposed between said switch and said member, a pivotally mounted stop biased to a position to arrest the movement of the member to the closed position, and electromagnetic means energized by a varying current for holding the said stop in the arresting position thereof until the energization of said means has dropped to a predetermined value and the force applied to the member by said switch through said spring overcomes the holding effect of said means on said stop.

In witness whereof, I have hereunto set my hand this 29th day of May, 1925.

GEORGE E. STACK.